UNITED STATES PATENT OFFICE.

CHARLES TOPPAN, OF WAKEFIELD, MASSACHUSETTS.

IMPROVEMENT IN PROCESSES OF TREATING ARTICLES TO RENDER THEM WATER-PROOF.

Specification forming part of Letters Patent No. 129,438, dated July 16, 1872.

Specification describing an Improved Process of Treating Articles so as to Render them Water-Proof, invented by CHARLES TOPPAN, of Wakefield, in the county of Middlesex and State of Massachusetts.

My invention relates to the treatment of textile and felted fabrics and other porous substances, as wood, leather, paper, &c., so as to render them water-proof.

Before describing my present invention I will refer to patents issued to me April 20, 1869, for inventions in this branch of the art. The process described in my patents of April 20, 1869, consisted in treating articles with a solution of paraffine dissolved in naphtha. This process is applicable for many articles; but for many other articles has disadvantages, which are overcome by my present invention.

My present invention consists in preparing a solution of paraffine and of caoutchouc or India rubber dissolved in naphtha, and then treating the articles by passing them through or dipping them in this solution, and afterwards evaporating the naphtha by natural or artificial heat or a current of air, leaving the articles impregnated with paraffine wax and caoutchouc.

To enable others skilled in the art to practice my invention, I will proceed to describe the process.

I first prepare a solution of paraffine in naphtha. This is done simply by putting the paraffine into the naphtha and letting it dissolve. The solution may be hastened by cutting the paraffine into small pieces by agitation and by heat. The proportion of each ingredient varies with different articles. For treating cloth of different kinds the amount of paraffine is from six ounces to two pounds to each gallon of naphtha. I also prepare a solution of caoutchouc or India rubber dissolved in naphtha. This solution may in like manner be hastened by cutting the rubber into small pieces, by agitation, and by heat. The proportion of India rubber is about one-quarter of a pound to each gallon of naphtha. Naphtha made from petroleum should be used.

I then mix the solution of paraffine with the solution of India rubber, taking care to mix thoroughly. The proportions to be used vary for different articles, but in treating cloth I prefer to put about a gill of the rubber solution to each gallon of the paraffine solution. After the solutions are mixed, it is best to allow the combined solutions to stand for a week or two, or longer. During all the process of preparing the solutions it is best to keep them at a temperature of from 70° to 80° Fahrenheit, and the united solution should be kept at about 80° Fahrenheit when being used. Having thus prepared a solution which contains both paraffine and India rubber, I treat the articles which are to be rendered water-proof with this solution. This may be done in various ways, and I do not limit myself to any particular method. The articles may be dipped into the solution or drawn through it, or the solution may be applied by means of a sponge, cloth, or brush. After being treated the naphtha is allowed to evaporate, and the evaporation may be hastened by natural or artificial heat or a current of air.

My invention is especially applicable to woolen cloths and thick fabrics. It is found that these, when treated with a solution of paraffine alone, are stiff and harsh, especially at low temperatures, but my new process renders them soft and flexible. It will be found that goods treated by my new process have many advantages. They are water-proof, and at the same time allow the air to pass through. The colors are improved and made more durable. The addition of the India rubber prevents the paraffine from crumbling and leaving the fabric. The goods do not become sticky from the effects of heat, as is the case with other fabrics made water-proof by means of rubber.

I have also discovered that other substances may be used in place of India rubber, such as gutta-percha, or both rubber and gutta-percha may be used together, or both or either of them may be used with spermaceti. The process is the same when these are substituted for the India rubber as the process already described.

I claim as my invention—

1. The above-described solution of paraffine combined with rubber or its substitutes or equivalents.

2. The above-described process of treating articles with the solution above described.

3. As a new manufacture, articles treated as above described.

CHARLES TOPPAN.

Witnesses:
CHARLES A. PHILLIPS,
CHARLES F. WOLCOTT.